United States Patent
Lin

(10) Patent No.: US 6,253,884 B1
(45) Date of Patent: Jul. 3, 2001

(54) REAR BRAKE UNIT FOR A BEACH BUGGY

(75) Inventor: Ming-Ching Lin, Kaohsiung Hsien (TW)

(73) Assignee: Aeon Motor Co., Ltd., Tainan (TW)

( * ) Notice: Subject to any disclaimer, the term of this patent is extended or adjusted under 35 U.S.C. 154(b) by 0 days.

(21) Appl. No.: 09/538,129

(22) Filed: Mar. 29, 2000

(51) Int. Cl.⁷ .................................................. F16D 51/00
(52) U.S. Cl. ......................... 188/78; 188/74; 188/106 A
(58) Field of Search ........................... 188/74, 78, 106 A

(56) References Cited

U.S. PATENT DOCUMENTS

| 4,646,865 | * | 3/1987 | Imaizumi et al. | 180/73.1 |
| 4,719,984 | * | 1/1988 | Watanabe | 188/18 A |
| 6,073,731 | * | 6/2000 | Ieda | 188/71.5 |
| 6,182,800 | * | 2/2001 | Mochizuki et al. | 188/71.5 |

\* cited by examiner

*Primary Examiner*—Christopher P. Schwartz
*Assistant Examiner*—Mariano Sy
(74) *Attorney, Agent, or Firm*—Pro-Techtor International Services

(57) ABSTRACT

A rear brake device for a beach buggy includes an axle sleeve, a brake disc fixed at one side of the axle sleeve and having two semicircular brake members, and a brake drum with a center serrated tube to engage and rotate synchronously with the axle. The brake disc and the brake drum are made of aluminum of high strength, and the axle sleeve is fixed at the other side of the brake disc, and the brake drum covers an outer side of the brake members. The axle fits in a cylindrical fix tube to force the brake drum firmly touch the brake disc without falling off and sealing the serrated connect tube, too. A dirt rubber ring is fitted around the joining location of the brake drum and the brake disc. Then the brake disc does not disfigure, and the brake drum can increase its size and functions as a cover so as to increase the friction coefficient to enhance braking effect.

2 Claims, 5 Drawing Sheets

REAR BRAKE UNIT FOR A BEACH BUGGY

BACKGROUND OF THE INVENTION

This invention relates to a rear brake unit for a beach buggy, particularly to one having a brake disc of high strength and with no fear of disfiguring, having comparatively better effect for braking.

Common conventional beach buggies have a rear wheel brake unit for controlling to reduce speed and stop the buggy. Its operating method includes a brake wire pulling brakes members of the rear wheel axle to expand to friction with an inner surface of a brake drum rotating with the axle of the rear wheels, achieving speed reduction and stop of the buggy.

A known conventional rear brake unit of a beach buggy has a structure shown in FIGS. 1 and 2, including a axle sleeve 10 fitted around a rear wheel axle 50, a brake disc 20 welded with an outer end of the sleeve 10 by means of $CO_2$, a position rod 201 fixed on the brake disc 20 and an activating rod 202 connected to and pulled by a brake wire 2031 (not shown in Figures), two semicircular brake members 203 located beside the brake disc 2 fixed between and pulling to expand or loosening the brake members 23. The two semicircular brake members 23 have one end clamping the position rod 201 of the brake disc 20, not separating from the brake disc 20, and the other end clamping a flat activating block 2021 of the activating rod 202, as shown in FIG. 2. Further a brake drum 30 surrounds the two semicircular brake members 203 engaging and rotating with the rear axle 50, which has its end engages with the brake drum 30. Further, a dirt cover 40 is fixed to hide the brake drum 30, preventing dirt from entering the brake drum 30 to avoid undesirable wear and tear to affect braking effect.

The conventional brake disc 20 and the brake drum 30 are generally made of iron, and the brake disc 20 and the shaft sleeve 10 are welded together with $CO_2$, but the brake disc 20 may often disfigure in welding process. Once the brake disc 20 disfigures, an angle inclination may be formed to the shaft sleeve 10, not vertical, causing the position rod 201 of the brake disc 20 and the activating rod 202 also incline, not parallel to the axle 50 worsening contact of the brake members 203 with the brake drum 30 and lessening the dimensions of mutual friction and braking effect. In addition, the brake members 203 may bias to easily produce friction against the iron brake drum 30 and thus heighten temperature to make noise. In addition, when the brake wire pulls the activating rod 202 to activate the brake members 203, the brake members 203 can only partly touch and friction with the brake drum 30 owing to the inclined activating rod 202, causing the brake disc 20 seriously disfigure under unbalanced friction. Furthermore, the brake drum 30 is hidden in the brake cover 40, forming a double-layer design, the brake drum 30 and the brake members 203 have to be reduced in their size, as the brake unit cannot be enlarged in order not to affect the other structures. Subsequently, the brake drum 30 is made to have a smaller inner diameter and thus also a smaller dimensions in the inner space, lessening accordingly the friction dimensions between the brake members 203 and the b rake drum 30 to lower braking effect. This structural problem of the conventional rear brake device has to be solved.

SUMMARY OF THE INVENTION

The objective of the invention is offer a rear brake device for a beach buggy, which has a brake disc of high strength, with no fear of disfiguration, increasing friction dimensions to enhance braking stability and simplifying assembling.

The feature of the invention involves an axle sleeve for a rear wheel axle to extend in, a brake disc with two semicircular brake members and a brake drum having a center serrated tube for the axle to engage and rotate together. The two semicircular brake members are pulled by two coil springs to pull them back after they are expanded to stop the rotation of the brake drum after pulling a brake wire to move an activating rod in expanding the brake drum. The characteristics of the device is that one end of the axle sleeve facing the brake disc is fixed firmly on the brake disc, to prevent the brake disc from disfiguring, and that the brake drum directly covers the outside of the brake disc, and a cylindrical fix member fitting around the axle forces the brake drum touch the brake disc and seals the serrated connect tube with a dirt rubber ring fitting around the joint locations of the brake drum and the brake disc. Then the contact dimensions of the brake members with the brake drum is increased to enhance braking effect to stop a beach buggy more quickly than the conventional one.

BRIEF DESCRIPTION OF DRAWINGS

This invention will be better understood by referring to the accompanying drawings, wherein.

DETAILED DESCRIPTION OF THE PREFERRED EMBODIMENT

Figure 1:
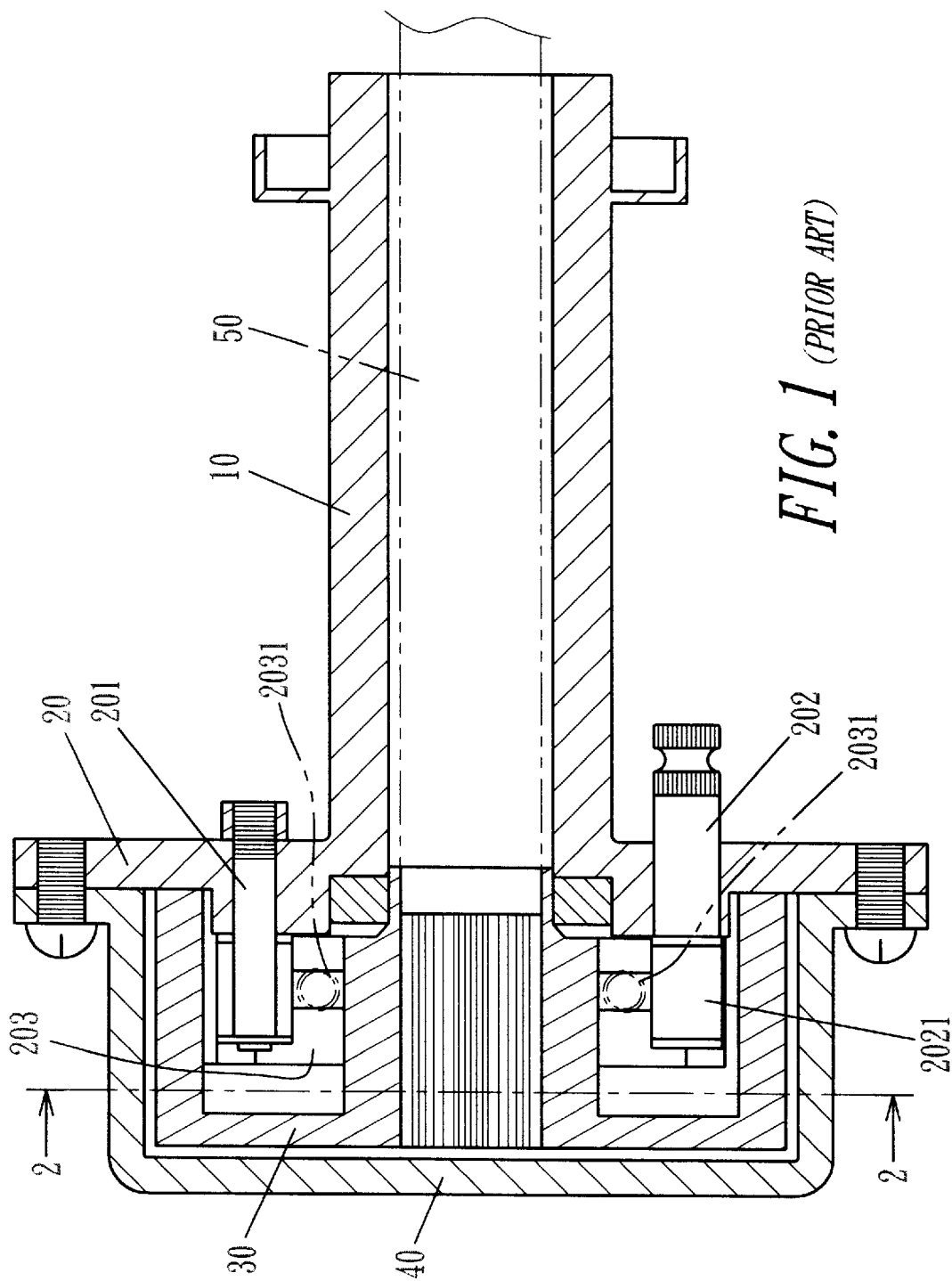
FIG. 1 is a cross-sectional view of a conventional rear brake device for a beach buggy.

A preferred embodiment of a rear brake device for a beach buggy in the present invention, includes an axle sleeve 1, a brake disc 2, a brake drum 3, a dirt rubber ring 4 as main components.

The axle sleeve 1 fits around an axle (not shown in Figures) of two rear wheels, having a first end formed as a fix base 11 of large dimensions.

The brake disc 2 is made of aluminum, with a circular integral shape, having two semicircular brake members 23 fixed at one side of the axle sleeve 1 and mutually pulled by two coil springs 231 located between the two semicircular brake members 23. One ends of the two semicircular brake members 23 clamp a position rod 21 and the other ends of them clamp a flat activating block 221 of the activating rod 22 of the brake disc 2, and the activating rod 22 is pulled by a brake wire to rotate bias to let the activating block 221 push the brake members 23 to expand outward.

The brake drum 3 is also made integral of aluminum, having a central serrated tube 31 fixed in a center hole for the axle of the rear wheels to pass and engage with to rotate together with the rear wheels. Further, a cylindrical fix member 32 is fixed with an outer center surface of the brake drum 3.

The dirt rubber ring 4 is fitted around an annular outer periphery of the brake drum 3.

Figure 4:
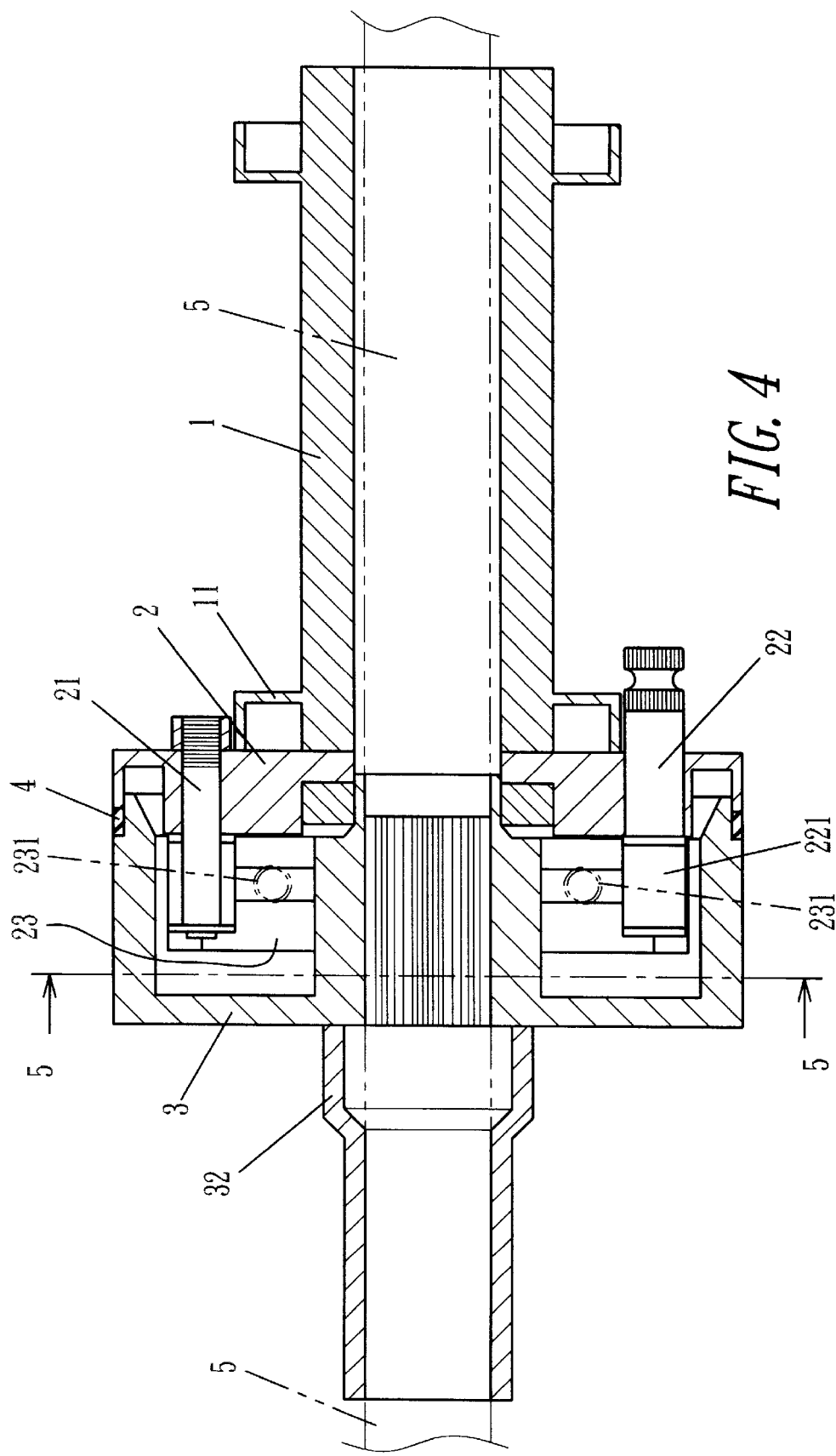
FIG. 4 is a cross-sectional view of the rear brake device for a beach buggy in the present invention: and, FIG. 5 is a cross-sectional view of the line 5—5 in FIG. 4, showing moving direction.

In assembling, referring to the FIG. 4, first, one end of the axle sleeve 1 is fixed on a body frame (not shown in Figures), and the other end, the fix base 11, is attached with the brake disc 2 and screwed tightly together with bolts and nuts. 6. Then the brake drum 3 is directly made to cover on the other side of the brake disc 2, with the brake members 23 and the coil springs 231 hidden inside the brake drum 3, and with the dirt rubber ring 4 fitted around the location joining the brake disc 2 and brake drum 3 to prevent dirt from entering in the interior of the brake drum 3 to cause wear. Then the axle 5 is made to extend in the axle sleeve 1, the brake disc 2 and the brake drum 3, in the cylindrical fix member 32 and connected to a tire cover (not shown in Figures). Then the cylindrical fix sleeve 32 tightly presses the outer side of the brake drum 3 not to fall off the brake disc 2, and at the same time seals the serrated connect tube 31, finishing assemblage of the rear brake device.

The invention has the following advantages, as can be understood from the aforesaid description.

Figure 2:
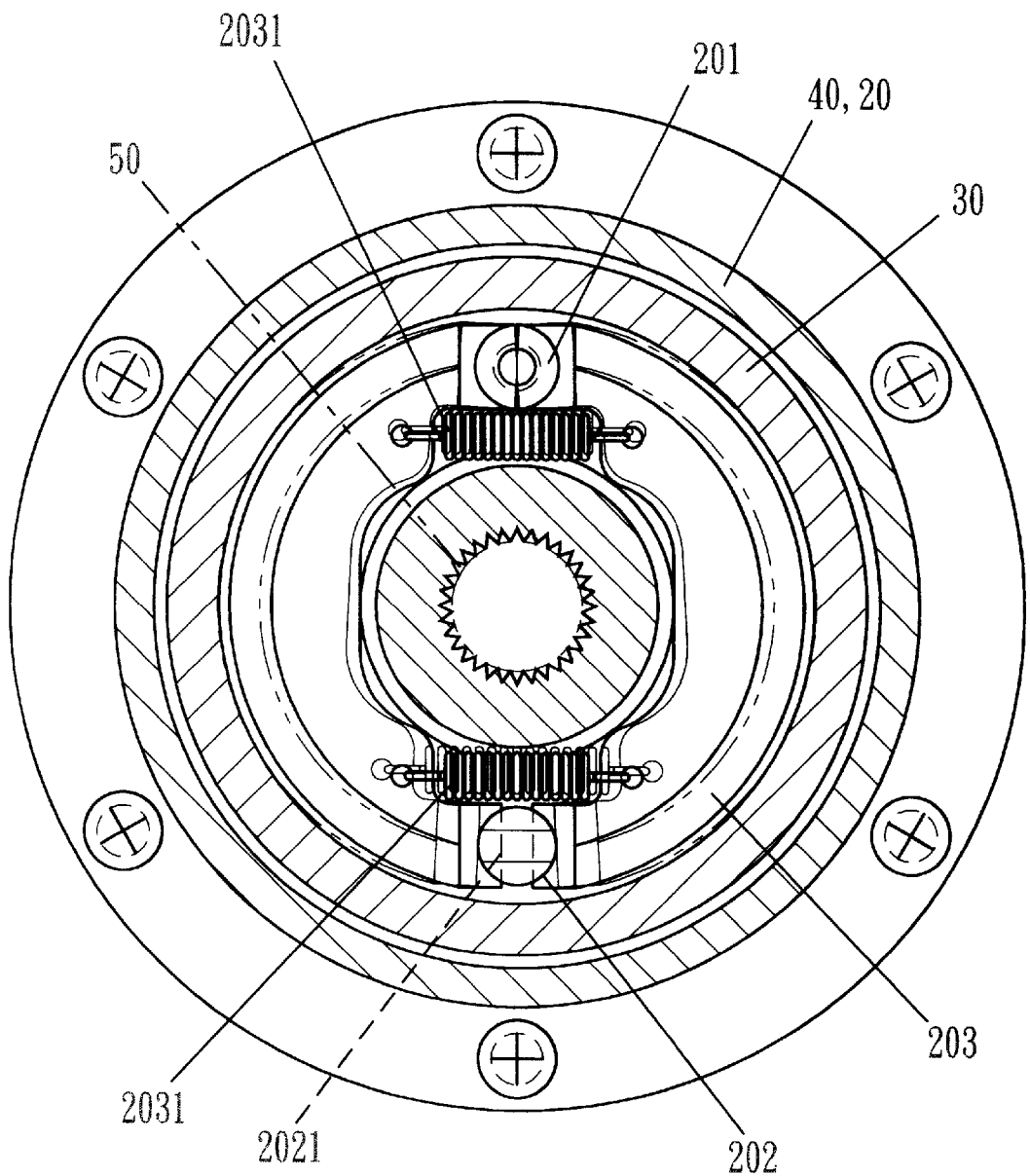
FIG. 2 is a cross-sectional view of the line 2—2 in FIG. 1, showing moving direction.
Figure 3:
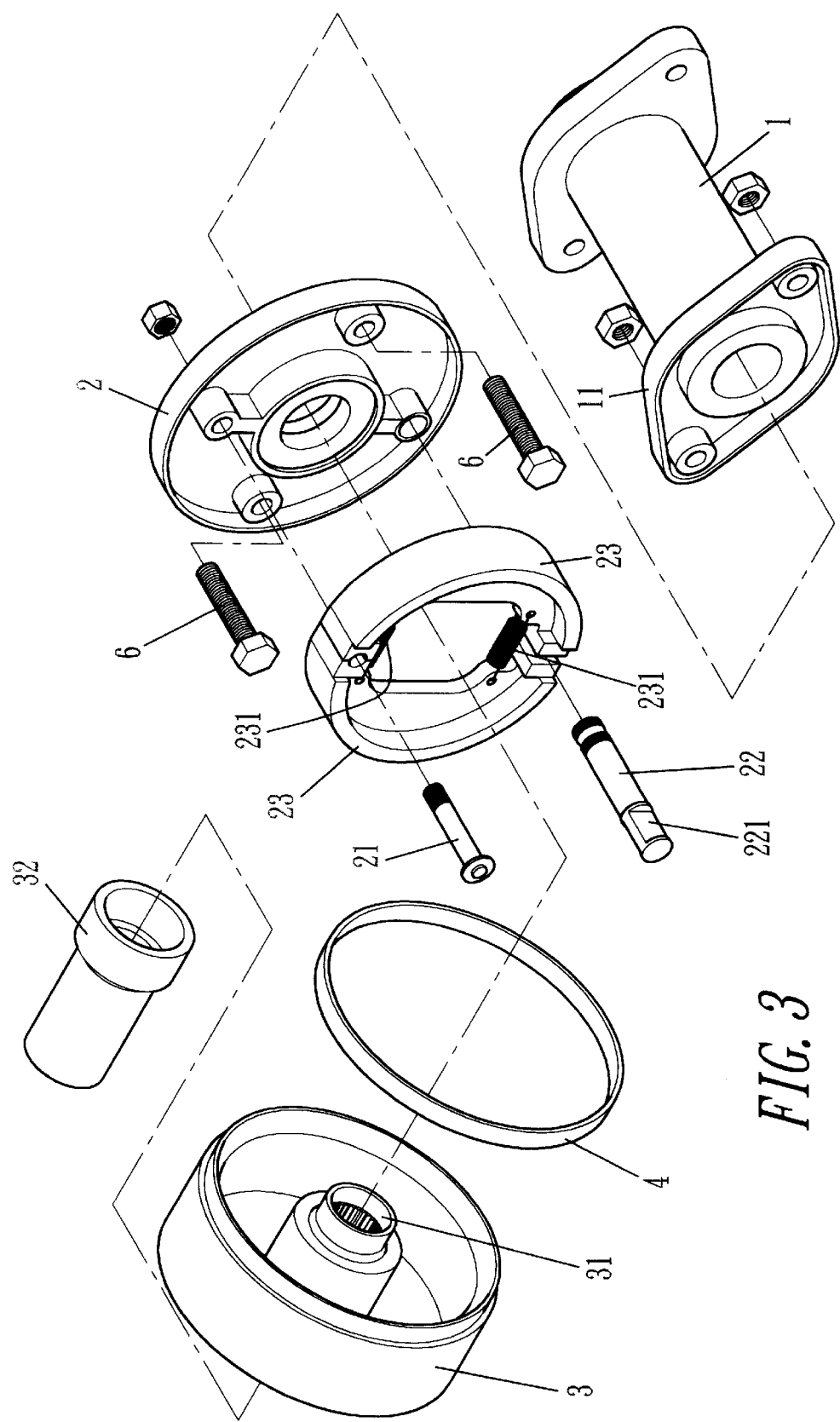
FIG. 3 is an exploded perspective view of a rear brake device for a beach buggy in the present invention.
Figure 5:
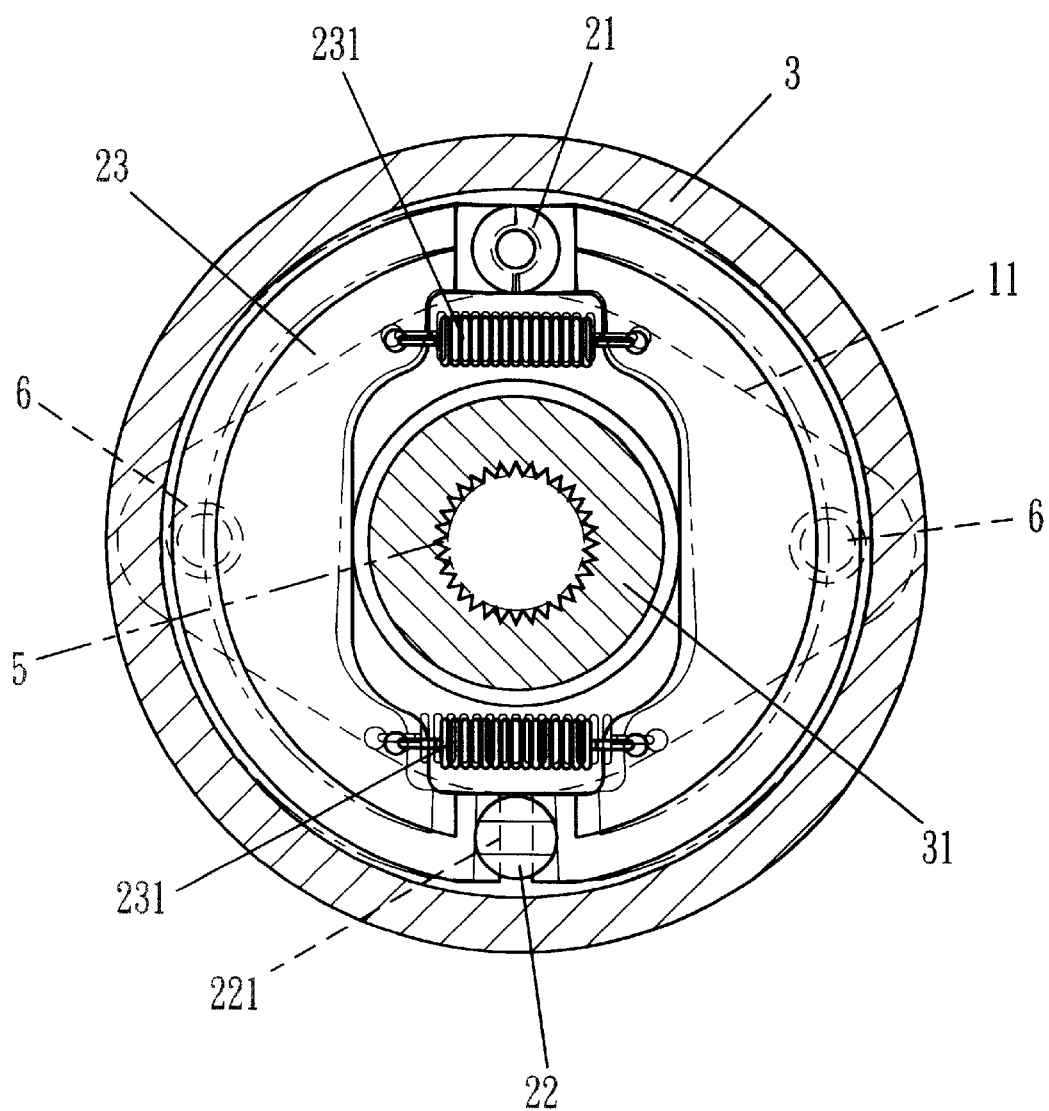

1. The brake disc does not disfigure, owing to the axle sleeve 1 and the brake disc 2 combined together tightly, with no fear of disfiguration owing to no high temperature welding, permitting the brake disc 2 kept vertical to the axle 5 in the best condition. In addition, the activating rod 22 is kept parallel to the axle 5, so the braking members 23 may completely fit on the inner surface of the brake drum 3 when they are expanded, with the friction dimensions increased to achieve better braking stability.
2. The brake drum 3 functions also as a cover, simplifying parts if compared with the conventional one, and the size of the brake drum 3 and the brake members 23 is augmented, while the conventional brake drum 30 has to be lessened in its size as the brake cover 40 is added, as shown in FIG. 2. So the brake members 203 only have the outer diameter 110 mm to have smaller dimensions for friction, but the brake members 23 in the invention can be increased to 130 mm without need of the cover, as shown in FIG. 5. Naturally, the friction dimensions of the brake drum 3 are enlarged compared to the conventional one. Therefore, only lightly pulling the brake wire can perform good braking action, with braking effect being far better than the conventional one.
3. The brake drum also has the function of a cover, simplifying parts, shortening the time needed for assembling, saving cost and quickening assembling speed.
4. The brake disc 2 and the brake drum 3 are all made of aluminum having high strength, with no fear of disfiguring and with excellent stability despite of long period of use and under heated up condition.

While the preferred embodiment of the invention has been described above, it will be recognized and understood that various modifications may be made therein and appended claimed are intended to cover all such modifications that may fall within the spirit and scope of the invention.

What is claimed is:

1. A rear brake device for a beach buggy comprising an axle sleeve for an axle of two rear wheels to fit in, a brake disc with two semicircular brake members fixed behind said axle sleeve, and a brake drum having a center hole fixed with a serrated connect tube to engage with and rotate synchronously with said axle, said two semicircular brake members pulled by two coil springs located between said two brake members, said two semicircular brake members activated to expand by an active rod pivotally connected to said brake disc, and characterized by one end of said axle sleeve facing said brake disc directly fixed firmly with said brake disc to prevent said brake disc from disfiguring, said brake drum directly hiding an outer side of said brake disc, said axle fitting in a cylindrical connect tube to force said brake drum tightly touch said brake disc so as not to fall off and at the same time sealing said serrated connect tube, a dirt rubber ring placed around a joint locations of said brake drum and said brake disc, said brake drum serves as a cover, the friction dimensions between said brake members and said brake drum thus increased to heighten the friction coefficient and braking effect and simplify assembling process.

2. The rear brake device for a beach buggy as claimed in claim 1, wherein said brake disc and brake drum are made integral of aluminum, having high strength and no possibility of disfiguration.

* * * * *